US007967256B2

(12) United States Patent
Wong

(10) Patent No.: US 7,967,256 B2
(45) Date of Patent: Jun. 28, 2011

(54) SPACECRAFT BATTERY THERMAL MANAGEMENT SYSTEM

(75) Inventor: Hamilton Wong, Skillman, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 1235 days.

(21) Appl. No.: 11/797,798

(22) Filed: May 8, 2007

(65) Prior Publication Data

US 2008/0277532 A1    Nov. 13, 2008

(51) Int. Cl.
*B64G 1/58* (2006.01)
(52) U.S. Cl. ..................................................... 244/171.8
(58) Field of Classification Search ............... 244/171.8, 244/117 A; 165/41, 171, 104.14, 104.22, 165/904
See application file for complete search history.

(56) References Cited

U.S. PATENT DOCUMENTS

| | | | | |
|---|---|---|---|---|
| 3,489,203 A * | 1/1970 | Fischell | ........................ | 165/274 |
| 3,540,688 A | 11/1970 | Schulte | | |
| 3,749,156 A * | 7/1973 | Fletcher et al. | ............... | 165/276 |
| 4,880,050 A * | 11/1989 | Nakamura et al. | .............. | 165/41 |
| 5,117,901 A * | 6/1992 | Cullimore | ........................ | 165/86 |
| 5,332,030 A * | 7/1994 | Spencer et al. | ............... | 165/274 |
| 5,606,870 A | 3/1997 | Lester | | |
| 5,823,476 A | 10/1998 | Caplin | | |
| 5,823,477 A * | 10/1998 | York | ........................ | 244/171.8 |
| 5,957,408 A * | 9/1999 | Hall et al. | ................. | 244/158.1 |
| 6,003,817 A | 12/1999 | Basuthakur et al. | | |
| 6,017,013 A | 1/2000 | Simonian | | |
| 6,027,077 A | 2/2000 | Eller et al. | | |
| 6,073,888 A | 6/2000 | Gelon et al. | | |
| 6,164,077 A | 12/2000 | Feger | | |
| 6,230,790 B1 | 5/2001 | Hemingway et al. | | |
| 7,270,302 B1 * | 9/2007 | Wong et al. | ................. | 244/171.8 |

* cited by examiner

*Primary Examiner* — Tien Dinh
(74) *Attorney, Agent, or Firm* — McDermott Will & Emery LLP

(57) ABSTRACT

A spacecraft battery thermal management system is provided that includes a battery, a first radiator panel and a second radiator panel. A first face of the first radiator panel is arranged to face a first direction and a first face of the second radiator panel is arranged to face a second direction opposite the first direction. A first heat pipe thermally couples the battery and the first radiator panel and is configured to control the transfer of heat between the battery and the first radiator panel. A second heat pipe thermally couples the battery and the second radiator panel and is configured to control the transfer of heat between the battery and the second radiator panel. Solar cells are optionally arranged on the faces of the first and/or second radiator panels.

7 Claims, 4 Drawing Sheets

WEST                                                                EAST

SPACECRAFT BATTERY THERMAL MANAGEMENT SYSTEM

STATEMENT REGARDING FEDERALLY SPONSORED RESEARCH OR DEVELOPMENT

Not applicable.

BACKGROUND OF THE INVENTION

The invention concerns spacecraft power systems and in particular is directed to a spacecraft battery thermal management system for controlling the temperature of batteries within a spacecraft.

Spacecraft batteries must be maintained within specified temperature ranges during operation of the spacecraft. Excess heat generated by the batteries is dissipated using radiator panels thermally coupled to the batteries. The radiator panels are conductively bonded to one or more battery cells and are arranged with at least one face of the panel exposed to the cold temperatures of space. During charging operations, heat is supplied to the spacecraft batteries using power consuming heaters. The thermal management systems used in conventional spacecraft, however, constrain the overall payload capabilities of the spacecraft.

Spacecraft operating in geosynchronous orbits use North and South facing surfaces for transponder panels containing payload and bus equipment configured for the spacecraft mission. To minimize solar impingement and diurnal variation, spacecraft batteries typically are arranged with the conductively bonded radiators also facing North or South. One such arrangement is represented in the block diagram depicted in FIG. 1. North battery 1 and South battery 2 are shown in FIG. 1 conductively bonded to thermal radiator 3 and thermal radiator 4, respectively. When arranged in a spacecraft operating in a geosynchronous orbit, North battery 1 and thermal radiator 3 are positioned with a face 3a of thermal radiator 3 exposed to space on a North facing side of the spacecraft (not shown) and South battery 2 and thermal radiator 4 are positioned with a face 4a exposed to space on a South facing side of the spacecraft.

Spacecraft batteries typically require lower temperatures than those required by other payload and bus equipment in the spacecraft. Accordingly, the thermal radiating surface area required for the spacecraft batteries is greater than that required for the other payload and bus equipment. When positioned on the North or South facing sides of the spacecraft, the spacecraft batteries and their conductively bonded thermal radiators significantly reduce the area available to other payload and bus equipment on the North and South facing sides of the spacecraft. A need exists for improved spacecraft battery thermal management systems that increase the amount of space available for mission critical payload and bus equipment while maintaining the temperature ranges required by the spacecraft batteries.

BRIEF SUMMARY OF THE INVENTION

The invention addresses the foregoing limitations of conventional spacecraft by providing a spacecraft battery thermal management system in which multiple radiator panels are thermally coupled to a battery using heat pipes. The heat pipes allow the radiator panels to be spatially displaced from the battery and positioned on opposite sides of the spacecraft. The transfer of heat between the radiator panels and the battery is controlled so that when one radiator panel is illuminated by the sun another radiator panel on an opposite side of the spacecraft dissipates excess heat from the battery. In this manner, the invention allows the radiator panels to be positioned on the East and West facing sides of a spacecraft in a geosynchronous orbit thereby freeing up area on the North and South facing sides for additional payload and bus equipment capacity.

According to one aspect of the invention, a spacecraft battery thermal management system is provided that includes a battery, a first radiator panel and a second radiator panel. A first face of the first radiator panel is arranged to face a first direction and a first face of the second radiator panel is arranged to face a second direction opposite the first direction. A first heat pipe thermally couples the battery and the first radiator panel and is configured to control the transfer of heat between the battery and the first radiator panel. A second heat pipe thermally couples the battery and the second radiator panel and is configured to control the transfer of heat between the battery and the second radiator panel.

According to another aspect of the invention, a spacecraft battery thermal management system is provided that includes multiple batteries, a first radiator panel and a second radiator panel. A first face of the first radiator panel is arranged to face a first direction and a first face of the second radiator panel is arranged to face a second direction opposite the first direction. A thermal coupler thermally couples the multiple batteries. A first heat pipe thermally couples the thermal coupler and the first radiator panel and is configured to control the transfer of heat between the thermal coupler and the first radiator panel. A second heat pipe thermally couples the thermal coupler and the second radiator panel and is configured to control the transfer of heat between the thermal coupler and the second radiator panel.

The foregoing summary of the invention has been provided so that the nature of the invention can be understood quickly. A more detailed and complete understanding of the preferred embodiments of the invention can be obtained by reference to the following detailed description of the invention together with the associated drawings.

DETAILED DESCRIPTION OF THE INVENTION

The detailed description of the invention set forth below in connection with the associated drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without all of the specific details contained herein. In some instances, well known structures and components are shown in block diagram form in order to avoid obscuring the concepts of the invention.

Figure 2:
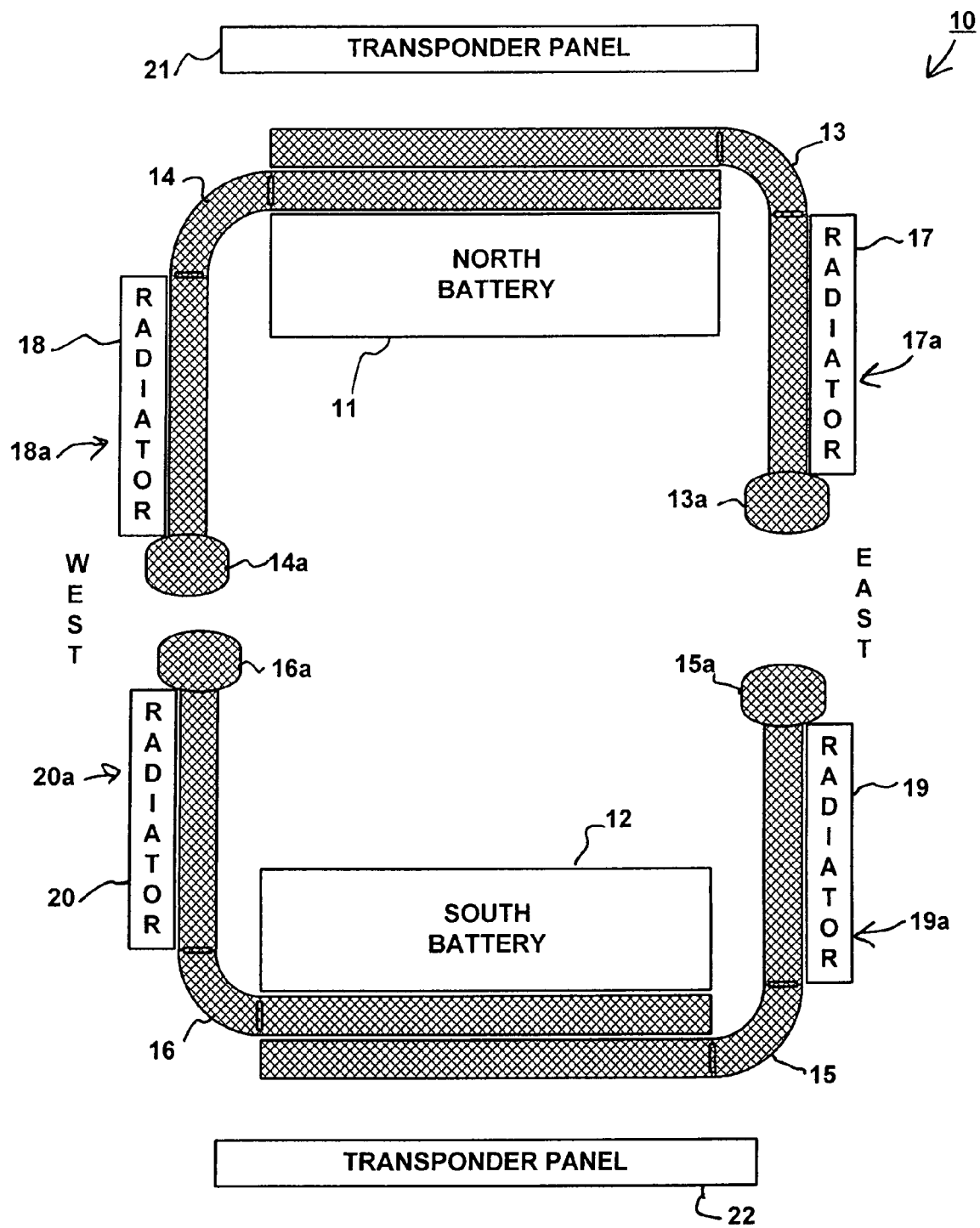
FIG. 2 is a block diagram depicting a spacecraft battery thermal management system according to one embodiment of the invention.

FIG. 2 is a block diagram depicting the arrangement of a spacecraft battery thermal management system according to one embodiment of the invention. Spacecraft battery thermal management system 10 depicted in FIG. 2 includes North battery 11, South battery 12, heat pipes 13-16, reservoirs 13a-16a and radiator panels 17-20. Also shown in FIG. 2 are transponder panels 21 and 22. Spacecraft battery thermal management system 10 is depicted in an arrangement corresponding to a spacecraft operating in a geosynchronous orbit. Specifically, the North designator in North battery 11 indicates that North battery 11 is positioned in a North facing portion of the spacecraft (not shown). Similarly, the South designator in South battery 12 indicates that South battery 12 is positioned in a South facing portion of the spacecraft. East and West labels have been included in FIG. 2 to designate East and West facing sides of the spacecraft.

North battery 11 and South battery 12 each represent one or more battery cells arranged within a spacecraft to provide power to payload and bus equipment within the spacecraft. The invention is not limited to any particular type of battery and can be implemented using any of a number of battery technologies known to those skilled in the art. For example, North battery 11 and South battery 12 can be nickel hydrogen ($NiH_2$) batteries, nickel cadmium (NiCd) batteries, lithium ion batteries, lithium polymer batteries, etc. It is to be understood that North battery 11 can be implemented using either the same battery technology or a different battery technology as that used to implement South battery 12.

North battery 11 and South battery 12 are thermally coupled to a respective pair of radiator panels via heat pipes. As shown in FIG. 2, North battery 11 is thermally coupled to radiator panel 17 via heat pipe 13 and to radiator panel 18 via heat pipe 14. Specifically, an evaporator section of heat pipe 13 is conductively bonded to a face of North battery 11 and a condenser section of heat pipe 13 is conductively bonded to a face of radiator panel 17. Similarly, an evaporator section of heat pipe 14 is conductively bonded to a face of North battery 11 and a condenser section of heat pipe 14 is conductively bonded to a face of radiator panel 18. The conductive bonding can be performed using any material and technique known to those skilled in the art that facilitates the transfer of heat between the two joined bodies.

FIG. 2 depicts the evaporator section of heat pipe 14 as being position between the condenser section of heat pipe 13. This representation of the invention is intended to facilitate the description of the invention and is not intended to limit the relative positions of heat pipes 13 and 14 with respect to North battery 11. As will be understood by one skilled in the art, both heat pipes 13 and 14 are in thermal contact with a face of North battery 11. This thermal contact may be on the same face of North battery 11 or, alternatively, heat pipes 13 and 14 may be in thermal contact with different respective faces of North battery 11. Additionally, each of heat pipes 13 and 14 may be configured to be in thermal contact with multiple faces of North battery 11 to increase the heat transfer capacity of the system.

As noted above, spacecraft battery thermal management system 10 depicted in FIG. 2 is shown in an arrangement corresponding to a spacecraft operating in a geosynchronous orbit. Accordingly, a face 17a of radiator panel 17 is positioned to face East away from the spacecraft into space and a face 18a of radiator panel 18 is positioned to face in the opposite direction, West, away from the spacecraft into space. When one side of the spacecraft is exposed to the sun, thereby heating the exposed radiator panel and preventing it from being usable to dissipate heat, the opposite side of the spacecraft is sheltered from the sun and the radiator panel arranged on the sheltered side of the spacecraft is able to dissipate the unwanted heat. To prevent the transfer of heat from the exposed radiator panel to North battery 11, heat pipes 13 and 14 are configured to control the transfer of heat between radiator panels 17 and 18, respectively, and North battery 11.

According to one embodiment of the invention, the transfer of heat between radiator panels 17 and 18 and North battery 11 is controlled by implementing heat pipes 13 and 14 using variable conductance heat pipes. In addition to the evaporator and condenser sections, which contain a working fluid, variable conductance heat pipes include a reservoir containing a non-condensable gas in fluid communication with the condenser section of the heat pipe. As depicted in FIG. 2, heat pipes 13-16 include reservoirs 13a-16a. When the reservoir is heated, the non-condensable gas expands and displaces the working fluid in the condenser section of the heat pipe. In this manner the heat transfer capabilities of the heat pipe are slowly reduced and eventually shut down as the non-condensable gas fills the condenser section of the heat pipe. As the reservoir cools, the non-condensable gas contracts back into the reservoir and restores the heat transfer capabilities of the heat pipe.

Reservoir 13a is arranged adjacent to radiator panel 17 on the East facing side of the spacecraft. Similarly, reservoir 14a is arranged adjacent to radiator panel 18 on the West facing side of the spacecraft. When radiator panel 17 is exposed to the sun, reservoir 13a is heated by the sun simultaneously with radiator panel 17. By selection appropriate dimensions, working fluid, non-condensable gas, etc. for heat pipe 13, the heat transfer capabilities of heat pipe 13 can be shut down when radiator panel 17 reaches temperatures that render it useless for dissipating the excess heat from North battery 11. In a similar manner, heat pipe 14 and reservoir 14a are designed to control the heat transfer capabilities of radiator panel 18. The design of a heat pipe based on desired heat transfer characteristics is well known to those skilled in the art and will not be described further herein. It is noted that the actual positions of reservoirs 13a and 14a with respect to radiator panels 17 and 18, respectively, may vary from that depicted in FIG. 2 so long as the reservoirs are subjected to sufficient heat simultaneously with their respective radiator panels to operate in the manner described above.

The configuration and operation of South battery 12, heat pipes 15 and 16, reservoirs 15a and 16a, radiator panels 19 and 20 and faces 19a and 20a is the same as that described above with respect to North battery 11, etc. and will not be repeated herein. It is noted that while FIG. 2 includes two batteries, North battery 11 and South battery 12, it is to be understood that the invention could be implemented in alternative embodiments with only one battery or with three or more batteries, each with its own pair of heat pipes and associated radiator panels. It is further noted that the relative positioning of North battery 11 and South battery 12 with respect to the respective radiator panels can differ from that shown in FIG. 2. An advantage of the invention is that the location of the batteries is not limited to the perimeter of the spacecraft and can be positioned anywhere within the spacecraft subject to the design limitations of the heat pipes.

The configuration flexibility provided by the invention also allows the batteries to be positioned behind transponder panels containing payload or bus equipment, as shown in FIG. 2. This allows the available surface areas of transponder panels 21 and 22 to be expanded to include the North and South facing areas of the spacecraft previously occupied by battery radiator panels. This additional area can be used for increased heat dissipation capacity, additional transponders, etc. Accordingly, the payload capacity of the spacecraft is increased. As noted above, the positions of the batteries within the spacecraft may vary and therefore the positions of the batteries relative to the transponder panels also may vary from that depicted in FIG. 2 without departing from the scope of the invention.

Figure 3:
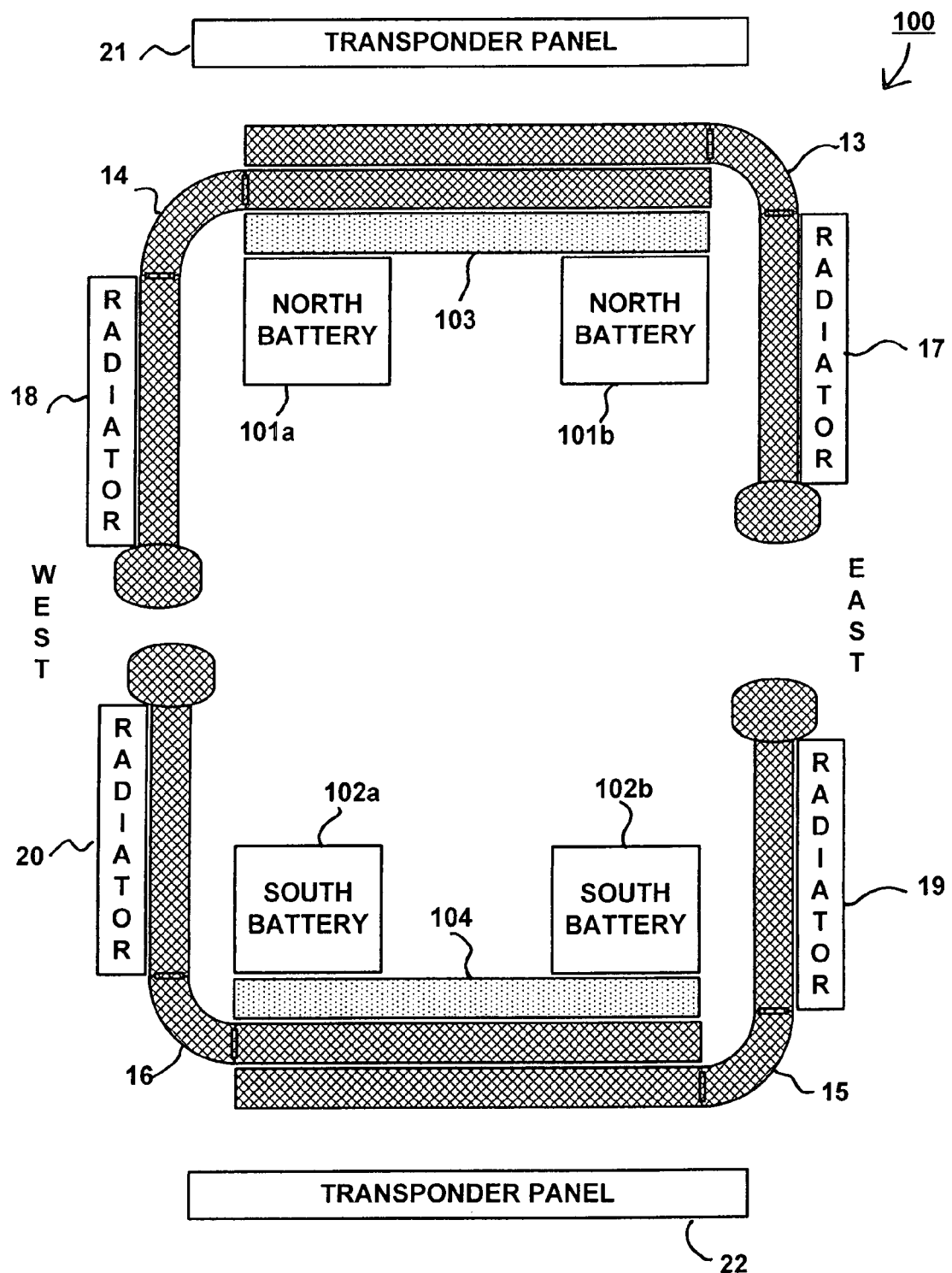
FIG. 3 is a block diagram depicting a spacecraft battery thermal management system according to one embodiment of the invention.

FIG. 3 is a block diagram depicting a configuration of spacecraft battery thermal management system 100 according to another embodiment of the invention. Like components are designated with the same reference numerals as used in FIG. 2. In FIG. 3, North battery 11 of FIG. 2 is replaced with North battery 101a, North battery 101b and thermal coupler 103. Similarly, South battery 12 of FIG. 2 is replaced with South battery 102a, South battery 102b and thermal coupler 104.

As shown in FIG. 3, North battery 101a and North battery 101b are coupled together via thermal coupler 103. Thermal coupler 103 is conductively bonded to respective faces of North battery 101a and North battery 101b, thereby allowing heat to be transferred between thermal coupler 103 and North batteries 101a and 101b. According to one embodiment of the invention, thermal coupler 103 is a constant conductance heat pipe. The configuration and operation of a constant conductance heat pipe is known to those skilled in the art and will not be described further herein. The invention is not limited to a constant conductance heat pipe and can be implemented using other thermally conductive devices known to those skilled in the art.

Similar to North battery 11 depicted in FIG. 2, thermal coupler 103 is conductively bonded to the evaporator sections of heat pipes 13 and 14. While heat pipe 14 is depicted in FIG. 3 as being positioned between thermal coupler 103 and heat pipe 13, this depiction of the invention is for ease of description and is not intended to limit the relative positions of these components. Both heat pipes 13 and 14 are conductively bonded to thermal coupler 103 to facilitate the transfer of heat between North batteries 101a and 101b and radiators 17 and 18. In addition, thermal coupler 103 can be configured to be bonded to more than one face of each of North batteries 101a and 101b. While FIG. 3 depicts North batteries 101a and 101b bonded to thermal coupler 103 at positions opposite where heat pipes 13 and 14 are bonded to thermal coupler 103, it is to be understood that thermal coupler 103 can be extended to allow North batteries 101a and 101b to be positioned at other locations away from the section of thermal coupler 103 bonded to heat pipes 13 and 14. This alternative configuration allows for additional payload or bus equipment to be arranged behind transponder panels 21 and 22 in the areas previously occupied by the batteries. Thermal coupler 103 is conductively bonded to heat pipes 13 and 14 using any of a number of techniques known to those skilled in the art.

The operation of spacecraft battery thermal management system 100 depicted in FIG. 3 is similar to that of spacecraft battery thermal management system 10 depicted in FIG. 2. Excess heat generated by North batteries 101a and 101b is transferred via thermal coupler 103 to heat pipes 13 and 14. In the manner described above with respect to FIG. 2, this excess heat is then transferred to radiators 17 and 18 via heat pipes 13 and 14.

South batteries 102a and 102b and thermal coupler 104 are configured and operate in the same manner as North batteries 101a and 101b and thermal coupler 103 and therefore will not be described in detail herein. Similar to spacecraft battery thermal management system 10, spacecraft battery thermal management system 100 is not limited to the two groups of batteries depicted in FIG. 3. Alternative embodiments of the invention can be implemented using a single group of batteries with a respective thermal coupler, heat pipes and radiator panels, or with three or more groups of batteries with their respective thermal couplers, heat pipes and radiator panels without departing from the scope of the invention. Furthermore, each group of batteries is not limited to the two shown in FIG. 3. Alternative embodiments of the invention may couple three or more batteries with a single thermal coupler.

Figure 1:
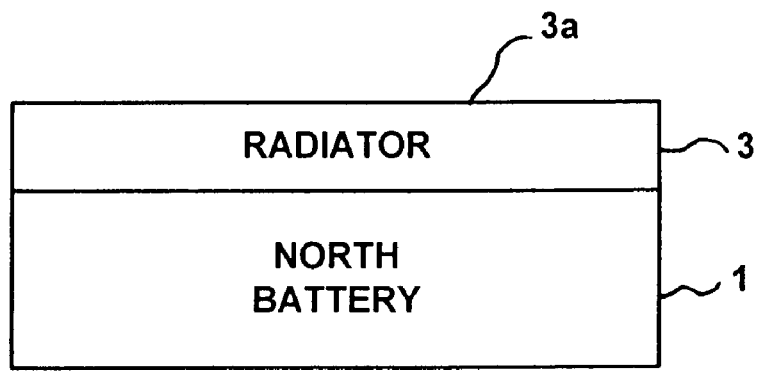
FIG. 1 is a block diagram depicting an arrangement of a spacecraft battery thermal management system.
Figure 1:
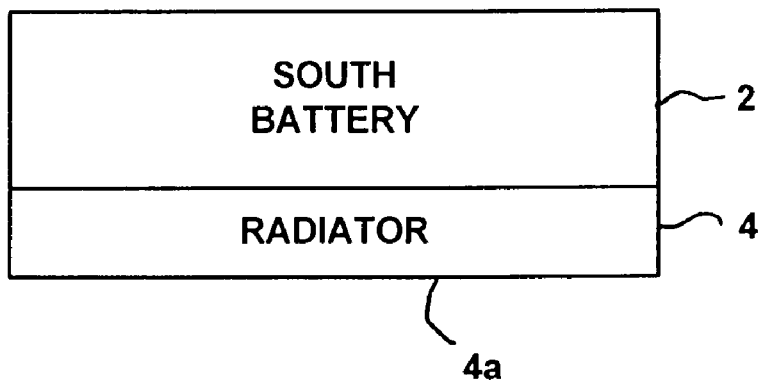
Figure 4:
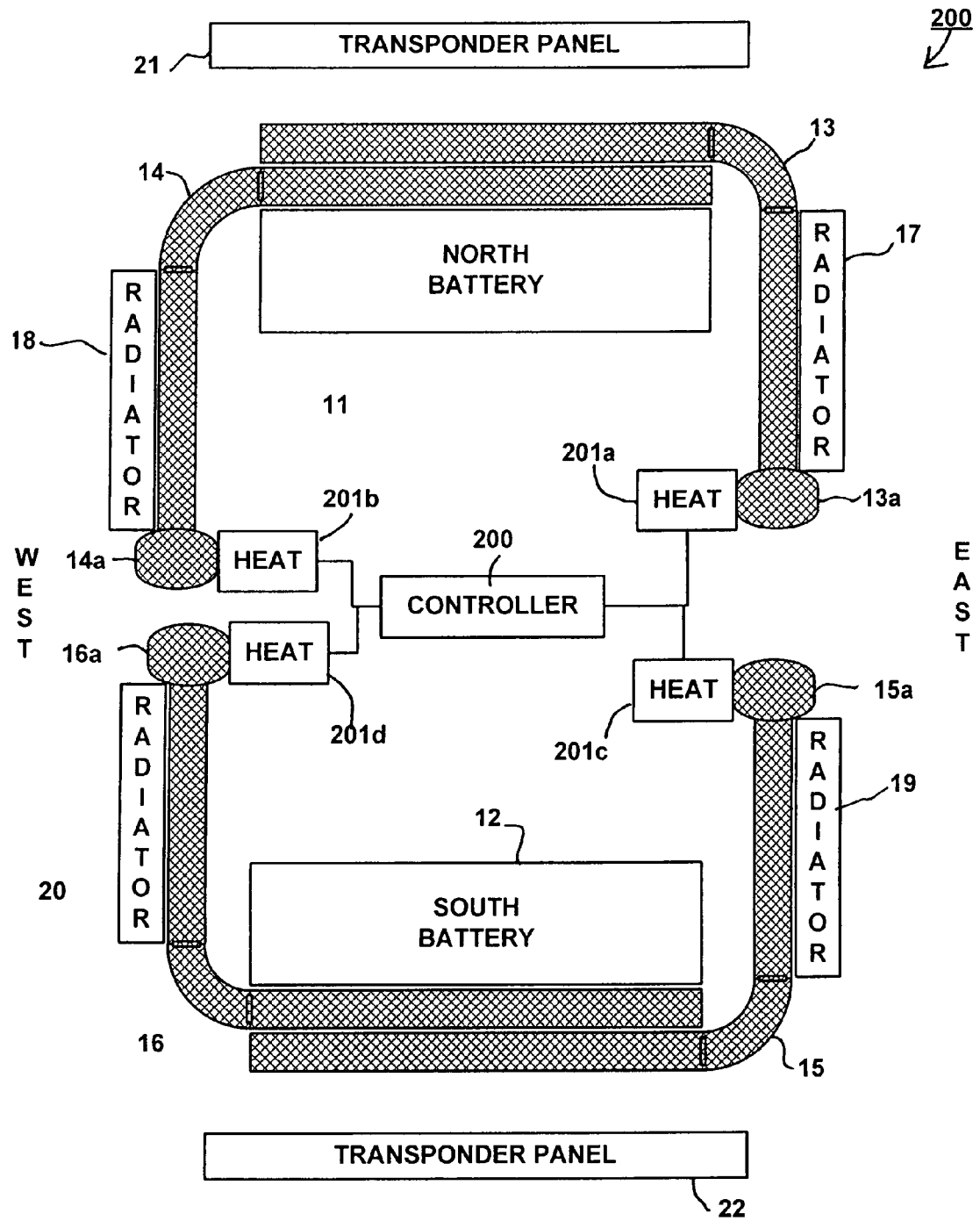
FIG. 4 is a block diagram depicting a spacecraft battery thermal management system according to one embodiment of the invention.

FIG. 4 is a block diagram depicting the configuration of spacecraft battery thermal management system 200 according to another embodiment of the invention. Spacecraft battery thermal management system 200 depicted in FIG. 4 differs from that depicted in FIG. 1 in that a controller 200 and heaters 201a-201d are incorporated into the system. Controller 200 and heaters 201a-201d are used to control the transfer of heat between North battery 11 and radiator panels 17 and 18 and between South batter 12 and radiator panels 19 and 20 while recharging North battery 11 and/or South battery 12.

When North battery 11 is trickle charging or is endothermic during a recharge operation, the temperature requirements for North battery 11 differ from those during normal operations. In conventional systems where the battery is continuously dissipating heat via a radiator directly bonded to the battery, a heater is often required to supply heat to the battery. To reduce or remove the need for a heater to apply heat to North battery 11 during trickle charging or recharge operations, controller 200 controls heaters 201a and 201b to disable the heat transfer capabilities of heat pipes 13 and 14, respectively. Specifically, controller 200 activates heaters 201a and 201b to apply heat to reservoirs 13a and 14a, respectively. This applied heat causes the non-condensable gas in each reservoir to expand and displace the working fluid in the condenser sections of heat pipes 13 and 14, thereby disabling the heat transfer capabilities of the heat pipes. This operation prevents the unwanted dissipation of heat during charging operations and requires a fraction of the power necessary to heat the entire battery, as done in conventional systems. The operation of heaters 201c and 201d is the same as that for heaters 201a and 201b and therefore will not be repeated herein.

Controller 200 may be programmed to activate all of the heaters associated with a battery being charged automatically upon commencement of the charging operations. Alternatively, controller 200 may use one or more sensors to determine which reservoirs are already subjected to sufficient sunlight to deactivate their respective heat pipes and only activate those heaters that are not sufficiently heated by the sun. The sensors may be configured to detect light and/or temperature to determine when additional heat is necessary for a particular reservoir. The foregoing configurations of a spacecraft battery thermal management system compensates for the solar impingement and diurnal variation experienced by the East and West facing sides of a spacecraft operating in a geosynchronous orbit. The battery heat load is actively transferred back and forth between the East and West facing radiator panels depending on which side is exposed to the sun. The environmental differences between when a radiator panel is exposed to the sun and when it is positioned on the opposite side of the spacecraft provide additional advantageous efficiencies.

For example, East/West positioned radiator panels typically go through extremes of exposure to sunlight when used in spacecraft operating in geosynchronous orbits. These extremes range from direct sunlight to complete blockage of the sun. When the radiator panels are completely blocked from the sun, they dissipate heat much more efficiently than radiator panels having North/South configurations. Accordingly, the overall size of the East/West radiators can be reduced from that required in North/South configurations.

Additionally, when the radiator panels are exposed to sunlight and therefore deactivated by the operation of the variable conductance heat pipe, they are in an optimal position for using solar cells to capture energy from the sun. Accordingly, alternative embodiments of the invention arrange solar cells on the radiator panels to provide additional surface area for capturing the sun's energy during operation of the spacecraft. The configuration of solar cells and their associated energy capture systems is known to those skilled in the art and will not be described further herein.

The foregoing description is provided to enable one skilled in the art to practice the various embodiments of the invention described herein. Various modifications to these embodiments will be readily apparent to those skilled in the art, and generic principles defined herein may be applied to other embodiments. Thus, the following claims are not intended to be limited to the embodiments of the invention shown and described herein, but are to be accorded the full scope consistent with the language of the claims. All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A spacecraft battery thermal management system, comprising:
    a battery;
    a first radiator panel, wherein a first face of said first radiator panel is arranged to face a first direction;
    a first variable conductance heat pipe thermally coupled to said battery and said first radiator panel, wherein said first variable conductance heat pipe comprises a first main pipe containing a first working fluid and a first reservoir containing a first non-condensable gas, and where said first variable conductance heat pipe is configured to control the transfer of heat between said battery and said first radiator panel;
    a second radiator panel, wherein a first face of said second radiator panel is arranged to face a second direction opposite the first direction; and
    a second variable conductance heat pipe thermally coupled to said battery and said second radiator panel, wherein said second variable conductance heat pipe comprises a second main pipe containing a second working fluid and a second non-condensable gas, and wherein said second variable conductance heat pipe is configured to control the transfer of heat between said battery and said second radiator panel,
    wherein said first reservoir is arranged adjacent to said first radiator panel such that said first reservoir and said first radiator panel are heated by the sun simultaneously, and
    wherein said second reservoir is arranged adjacent to said second radiator panel such that said second reservoir and said second radiator panel are heated by the sun simultaneously.

2. The spacecraft battery thermal management system according to claim 1, further comprising:
    a first heater configured to apply heat to said reservoir of said first heat pipe;
    a second heater configured to apply heat to said reservoir of said second heat pipe; and
    a controller configured to activate said first and second heaters in response to predetermined conditions,
    wherein the transfer of heat between said battery and said first and second radiator panels is controlled by said controller via said first and second heaters, respectively.

3. The spacecraft battery thermal management system according to claim 2, further comprising:
    a first sensor arranged adjacent to said first radiator panel; and
    a second sensor arranged adjacent to said second radiator panel,
    wherein said controller is configured to control the operation of said first and second valves in response to signals generated by said first and second sensors, respectively.

4. The spacecraft battery thermal management system according to claim 3, wherein said first and second sensors are temperature sensors.

5. The spacecraft battery thermal management system according to claim 3, wherein said first and second sensors are light sensors.

6. The spacecraft battery thermal management system according to claim 1, wherein the first direction is East and the second direction is West when a spacecraft comprising said spacecraft battery thermal system is in orbit.

7. The spacecraft battery thermal management system according to claim 1, wherein said first radiator panel comprises a plurality of solar cells arranged on the first face of said first radiator panel, and said second radiator panel comprises a plurality of solar cells arranged on the first face of said second radiator panel.

* * * * *